United States Patent [19]

Bush et al.

[11] Patent Number: 4,686,198

[45] Date of Patent: Aug. 11, 1987

[54] METHOD FOR REGENERATING ADSORBENT MIXTURE OF ALUMINA AND ZEOLITE FOR ADSORPTION OF AMMONIA

[75] Inventors: J. Finley Bush, Plum Borough; Donald R. Mydock, Allegheny Township, Armstrong County, both of Pa.

[73] Assignee: Aluminum Company of America, Pittsburgh, Pa.

[21] Appl. No.: 877,638

[22] Filed: Jun. 23, 1986

[51] Int. Cl.$^4$ .................. B01J 38/64; B01J 20/34; B01D 15/00; C02F 1/42

[52] U.S. Cl. ............................. 502/25; 210/670; 210/681; 502/515

[58] Field of Search ................ 502/25, 515; 210/670, 210/681

[56] References Cited

U.S. PATENT DOCUMENTS

| 3,130,007 | 4/1964 | Breck | 502/79 |
| 3,723,308 | 3/1973 | Breck | 210/681 |
| 4,122,007 | 10/1978 | Yamamoto et al. | 502/25 |
| 4,219,441 | 8/1980 | Noshimura et al. | 502/25 |
| 4,344,851 | 8/1982 | Sherman et al. | 210/670 |

*Primary Examiner*—P. E. Konopka
*Attorney, Agent, or Firm*—Andrew Alexander; John P. Taylor

[57] ABSTRACT

A process is described for regeneration of an adsorbent having ammonia adsorbed thereon and comprising a mixture of an alumina and a Y zeolite. The adsorbent may be regenerated to substantially its original capacity for adsorbing ammonia by a two step process which comprises first treating the adsorbent with a saturated solution of an alkali metal carbonate such as sodium carbonate to remove a substantial portion of the ammonia sorbed on the adsorbent mixture and then treating the adsorbent in a second step with a saturated alkali metal bicarbonate solution such as sodium bicarbonate to restore the ammonia adsorption capacity of the adsorbent mixture to substantially its original capacity.

13 Claims, 5 Drawing Figures

METHOD FOR REGENERATING ADSORBENT MIXTURE OF ALUMINA AND ZEOLITE FOR ADSORPTION OF AMMONIA

BACKGROUND OF THE INVENTION

1. Field of the Invention

This invention relates to regeneration of an adsorbent. More particularly, this invention relates to a two step process for the regeneration of an adsorbent comprising a mixture of alumina and zeolite suitable for use as an adsorbent for ammonia.

2. Description of the Related Art

Waste streams from tanning processes usually contain ammonia, sulfides and dissolved organics due to the use of chemicals such as $(NH_4)_2SO_4$ and $NH_4Cl$ which are used in the tanning of hides and the organic residues from the hides.

Current commercially practiced methods for purifying waste streams from such processes employ precipitation techniques which are expensive and technically unsatisfactory. It is also known to individually remove some of the impurities found in such streams by use of adsorbents such as silica gel, activated alumina or zeolites.

In a copending Bush et al. application Ser. No. 877,554 entitled "Purification of Waste Stream From Tanning Process by Adsorption on an Adsorbent Comprising a Mixture of Alumina and Y Zeolite", filed on even date with this application and assigned to the assignee of this invention, cross-reference to which is hereby made, there is described and claimed a process for treatment of an aqueous effluent containing ammonia. In this process, an aqueous effluent, such as the effluent from a tanning process, containing ammonia and organic materials, is contacted by an adsorbent which comprises a mixture of alumina and a sodium type Y zeolite. This adsorbent mixture has been found to be particularly effective in removing ammonia from waste water.

When an adsorbent is used to remove impurities from a liquid in contact therewith, the adsorption capacity of the particular adsorbent is at some point reached. At this time, the adsorbent must be replaced either by discarding the adsorbent or by regenerating the material by stripping or desorbing the adsorbed material from the adsorbent. Environmental constraints as well as the chance to recover valuable materials for recycling make regeneration rather than discard the choice for spent or saturated adsorbent.

In the aforesaid copending application, reference is made to regeneration of the saturated adsorbent by treating the adsorbent with a base to desorb the ammonia (the ammonium ion) from the adsorbent mixture. While such regeneration is effective to remove much of the adsorbed ammonia, it has been found that the adsorption capacity for ammonia of the regenerated adsorbent is usually not as high as that of the original ammonia adsorption capacity of the adsorbent.

It has now been discovered that the ammonia adsorption capacity of an adsorbent comprising a mixture of alumina and Y type zeolite can be completely restored during regeneration to as good or better than the original ammonia adsorption capacity of the adsorbent mixture.

SUMMARY OF THE INVENTION

It is, therefore, an object of this invention to provide an improved process for the regeneration of an adsorbent comprising a mixture of alumina and Y type zeolite wherein the ammonia adsorption capacity of the regenerated adsorbent will be as good or better than the original adsorbent capacity.

It is another object of this invention to provide an improved two step process for the regeneration of an adsorbent comprising a mixture of alumina and Y type zeolite wherein the ammonia adsorption capacity of the regenerated adsorbent will be as good or better than the original adsorbent capacity.

It is yet another object of this invention to provide an improved two step process for the regeneration of an adsorbent comprising a mixture of alumina and Y type zeolite wherein the adsorbent mixture is treated in a first step with a first solution to remove substantially all of the adsorbed ammonia followed by a second treatment step with another solution to restore the original adsorption capacity to the adsorbent mixture.

These and other objects of the invention will be apparent from the following description and accompanying drawings.

In accordance with the invention, an adsorbent having ammonia adsorbed thereon and comprising a mixture of an alumina and a Y zeolite is regenerated to substantially its original capacity for adsorbing ammonia by a two step process which comprises first treating the adsorbent with a saturated solution of an alkali metal carbonate to remove a substantial portion of the ammonia sorbed on the adsorbent mixture and then treating the adsorbent in a second step with a saturated alkali metal bicarbonate solution to restore the ammonia adsorbent capacity of the adsorbent mixture to substantially its original capacity.

DETAILED DESCRIPTION OF THE INVENTION

Figure 1:
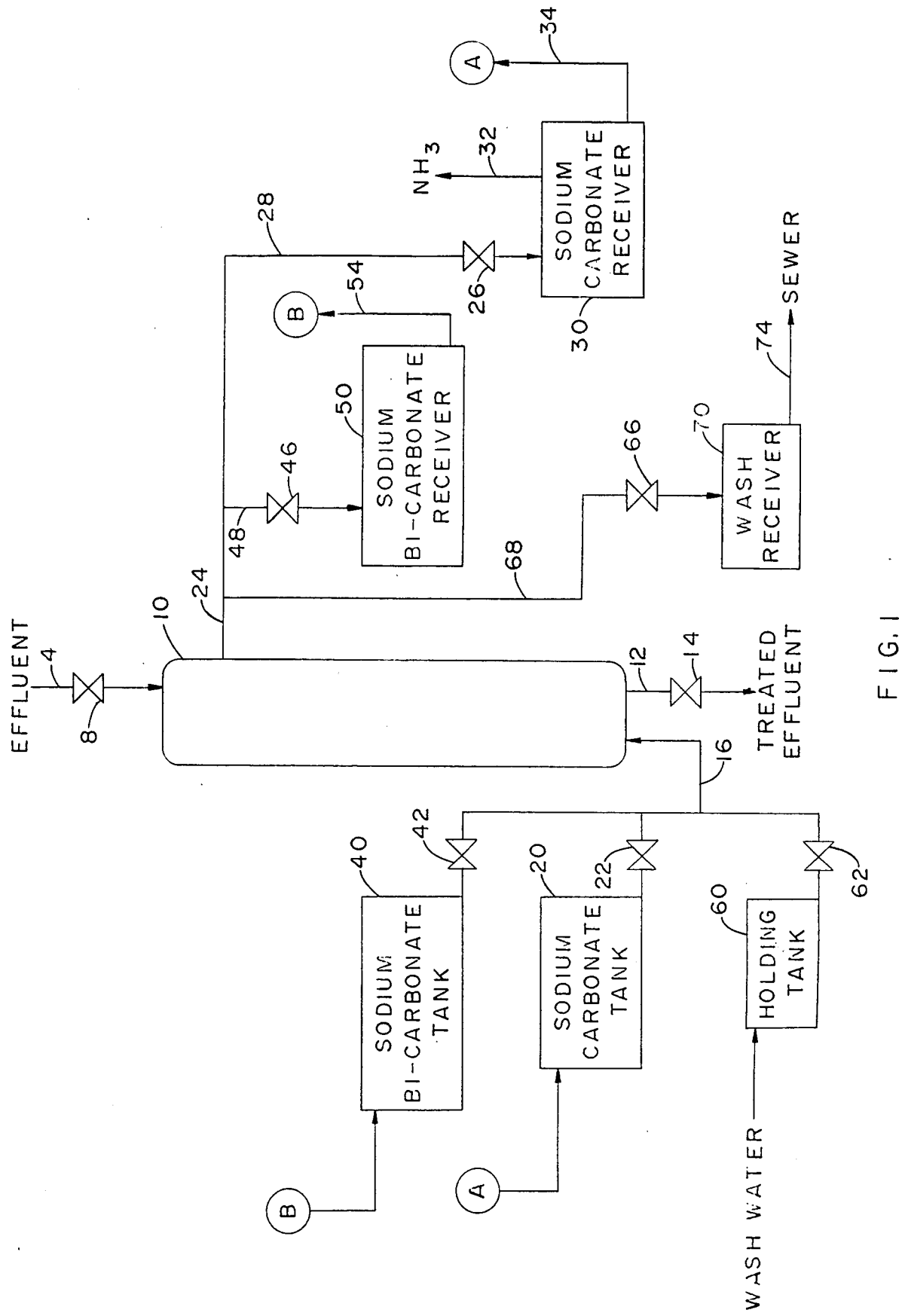
FIG. 1 is a pictorial diagram illustrating the process of the invention.

The invention provides a two-stage process for the regeneration of an adsorbent comprising a mixture of alumina and a Y type zeolite which has been used to adsorb ammonia from an impure solution such as the effluent from a tanning process. The adsorbent mixture is first treated with an alkali metal carbonate and then with an alkali metal bicarbonate to desorb the ammonia and to restore the adsorbent back to substantially its initial capacity.

The adsorbent mixture toward which the regeneration process of the invention is directed comprises a combination of from about 50-95 wt. % alumina and 5-50 wt. % Y zeolite, preferably about 70 to 80 wt. % alumina and from about 20 to 30 wt. % Y zeolite such as described and claimed in Goodboy et al U.S. patent application Ser. No. 795,907, assigned to the assignee of this invention and cross-reference to which is hereby made.

As described more fully in the aforementioned patent application, the adsorbent mixture useful in the process of this invention includes an alumina preferably having an average particle size of about 5 to 10 microns which has been rapidly activated by exposure to a temperature of greater than about 300° C. for less than a minute to form an activated alumina having an LOI (hydroxyl content determined by drying at 400° C. and then heating at 1100° C.) of about 4–10 wt. %. The alumina useful in the process of the invention is further characterized by a low $Na_2O$ content of 0.4 wt. % or less as well as having a low crystallinity structure, i.e., a structure which only gives weak X-ray diffraction patterns, which is predominantly a gamma structure.

The Y zeolite component of the adsorbent mixture comprises a synthetic, crystalline zeolitic sodium aluminosilicate such as disclosed in Breck U.S. Pat. 3,130,007. The Y zeolite preferably comprises particles of less than about 5 microns of a sodium Y zeolite with a $Na_2O$ content of at least about 12.7 wt. % with a molar ratio of $SiO_2$ to $Al_2O_3$ of about 4.5 to 6.0 and having a sufficiently low sodium silicate content that a 20 wt. % aqueous slurry of the particles will have a pH of less than about 10.42.

The adsorbent mixture is further characterized by a 4-8 wt. % loss on ignition (250-1200° C.), a crush strength above 10 lbs., a loose bulk density of about 31 lb/ft$^3$, and a packed bulk density of about 49 lb/ft$_3$. The total pore volume is at least 0.5 cc/g and preferably higher up to about 0.8 cc/g. Most of the pore volume, i.e., at least 40%, needs to be in the 60-150 angstrom range to minimize pore diffusion resistances.

The adsorbent mixture may be used in packed beds in granular form in order to keep the pressure drop across the bed fairly low. Although the process of the invention will be so illustrated as applied to an adsorbent in a packed bed or column, it must be noted that, alternatively, the adsorbent may be used in a fluidized bed or in any other form which will permit contact between the adsorbent and the aqueous solution to be purified.

During the process of adsorbing the ammonia from an impure effluent, when the capacity of the adsorbent for ammonia is reached, the ammonia must be stripped or desorbed to regenerate the adsorbent. The adsorption process must, therefore, be interrupted and the adsorbent bed drained of effluent in the bed prior to commencement of flow of the desorbing liquid.

In accordance with the invention, the regeneration, sometimes also referred to as stripping or desorbing, is carried out in a first step by passing a saturated solution of an alkali metal carbonate such as sodium carbonate ($Na_2CO_3$) through the adsorbent. The regeneration may be carried out at room temperature in which case the concentration of a saturated sodium carbonate solution would be about 360 g/l. Temperatures other than ambient temperature may be used, if desired, but the temperature generally will range from about 20 to 40° C.

The saturated alkali metal carbonate solution is passed through the adsorbent bed at a rate of about 1 bed volumes per hour. At least 2 bed volumes of alkali metal carbonate should be passed through the bed to ensure substantially complete desorption of the ammonia.

The alkali metal carbonate is preferably passed through the adsorbent countercurrent to the normal flow of the impure effluent through the bed to obtain maximum effectiveness of the desorption. Thus, for a vertical column, the flow of the saturated alkali metal carbonate solution should be upward or plug flow through the column.

The alkali metal carbonate solution and the ammonia stripped from the adsorbent pass from the adsorbent bed to a holding tank in which the ammonia may be separated from the regeneration solution and further processed such as by treatment with acid to form an ammonium salt, by direct recycling back to the process from which the impure effluent emanated, or by venting to the atmosphere if this is permissible.

After the alkali metal carbonate desorption step, the adsorbent is further treated with an alkali metal bicarbonate such as sodium bicarbonate ($NaHCO_3$) to restore the adsorbent to substantially its original capacity for adsorbing ammonia.

This treatment comprises passing about 1.5 to 4, preferably about 2 bed volumes of the saturated alkali metal bicarbonate solution through the adsorbent at a temperature which may vary from about room temperature up to about 50° C., preferably lower than 40° C., and typically ambient temperature, at a rate of about 1 to about 5 bed volumes per hour. Again, the flow of the regeneration fluid is preferably countercurrent, i.e., upward in plug flow in a vertical column of adsorbent.

Water is then started behind the alkali metal bicarbonate which pushes the alkali metal bicarbonate out of the adsorbent bed into a recovery tank where additional bicarbonate may be added to maintain the bicarbonate solution at a saturated concentration.

The concentration of ammonia in the alkali metal bicarbonate, after the desorption fluid has passed through the adsorbent, is fairly low, e.g., 0.2 g/l for sodium bicarbonate, indicating that the ammonia stripping or desorption is mainly carried out on the initial alkali metal carbonate treatment step.

However, for reasons not entirely understood, the desorption treatment with alkali metal carbonate, while removing substantially all of the adsorbed ammonia from the adsorbent, does not restore the adsorbent to its original ammonia adsorption capacity. While we do not wish to be bound by any theory of operation, it appears that the alkali metal ion in the alkali metal carbonate replaces the adsorbed ammonia, i.e., the ammonium ion, but apparently does not replace a hydrogen ion on the adsorbent which apparently also was displaced either during the ammonia adsorption or during the regeneration step. Subsequent treatment of the adsorbent with the alkali metal bicarbonate solution, while not seemingly desorbing much ammonia, appears to restore this displaced hydrogen ion on the adsorbent.

Referring now to FIG. 1, the process of the invention is pictorially illustrated. Effluent, containing ammonia (presumably as ammonium hydroxide), enters a column 10 via a conduit 4 and a valve 8. Column 10 contains an adsorbent comprising a mixture of alumina and a Y zeolite as previously described. Purified or treated effluent exits column 10 at conduit 12 and valve 14.

When the capacity of the adsorbent in column 10 to adsorb ammonia is reached, valves 8 and 14 are shut and a valve 22 is opened to permit flow of a saturated alkali metal carbonate such as sodium carbonate from tank 20.

At the same time, a valve 26 is opened leading to an alkali metal carbonate receiving tank to which the alkali metal carbonate solution flows from column 10 via conduits 24 and 28.

After the desired amount of alkali metal carbonate has been passed through the adsorbent in column 10, valves 22 and 26 are shut. The stripped ammonia in the alkali metal carbonate solution in receiver 20 may now be removed by any convenient means including heating the alkali metal carbonate to permit the ammonia, which has a low solubility in saturated alkali metal carbonate solutions, to pass through 32 for further processing as previously discussed. The alkali metal carbonate solution, after replenishment, may then be returned to tank 20 via conduit 34.

Following the alkali metal carbonate treatment, valve 42 is opened to admit alkali metal bicarbonate from tank 40 into column 10 through conduit 16. Valve 46 is also opened to permit the alkali metal bicarbonate flowing from column 10 to enter receiving tank 50 through conduit 48. Receiving tank 50 may be an open tank since, as previously described, very little ammonia will be present in the alkali metal bicarbonate solution. The alkali metal bicarbonate solution may be replenished to saturation in tank 50 and then returned to tank 40 through conduit 54.

After passing the desired volume of alkali metal bicarbonate through the adsorbent in column 10, valve 42 is shut and a valve 62 is opened to permit water in tank 60 to enter column 10 via conduit 16 to flush the alkali metal bicarbonate out of column 10. When all of the alkali metal bicarbonate is out of column 10, valve 46 is closed and a valve 66 is opened to permit the flushing water from column 10 to flow into receiving tank 70 through conduits 24 and 68. After suitable analysis to assure the purity of the flushing water in tank 70, it may be discharged through conduit 74.

Figure 2:
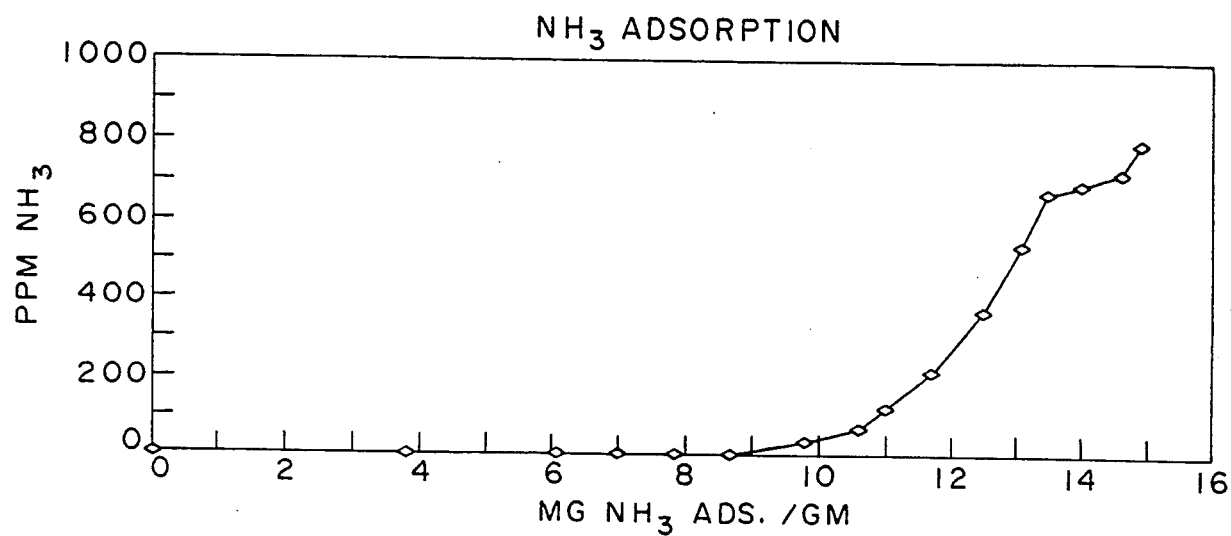
FIG. 2 is a graph plotting the original adsorption capacity of ammonia by the adsorbent in mg/g against the ammonia concentration in the effluent.
Figure 3:
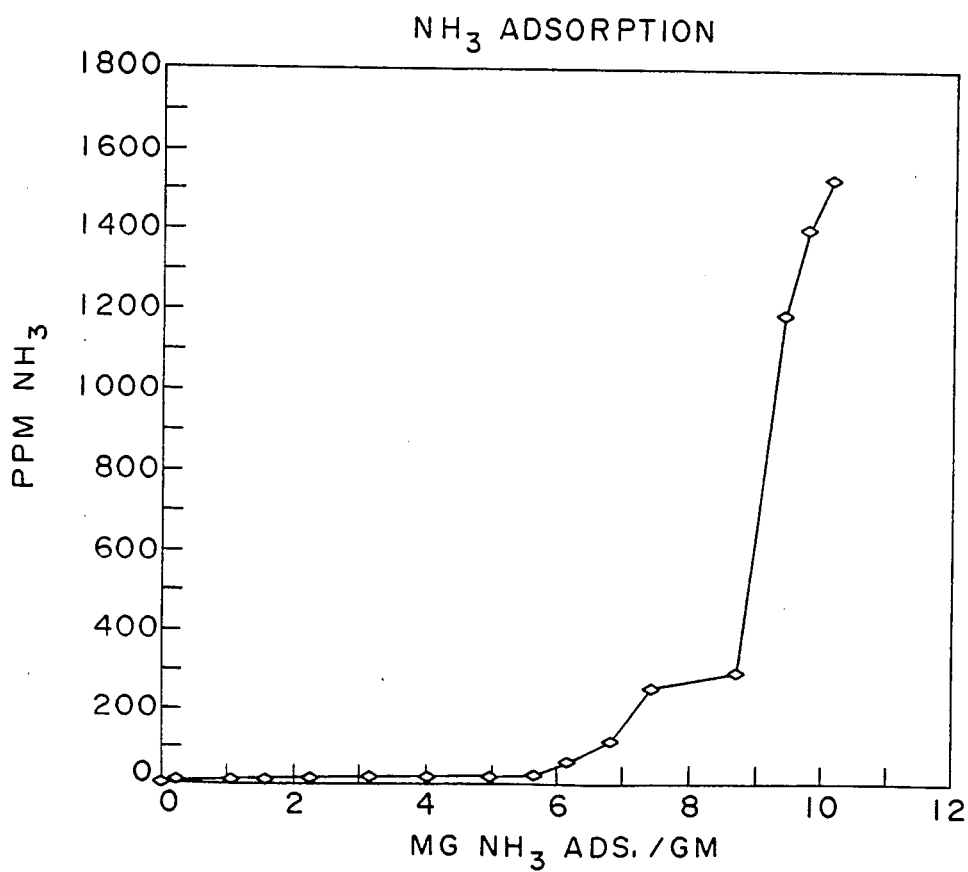
FIG. 3 is a graph plotting the adsorption capacity of ammonia by the adsorbent in mg/g against the concentration of ammonia in the effluent after treatment by the first step of the process of the invention.
Figure 4:
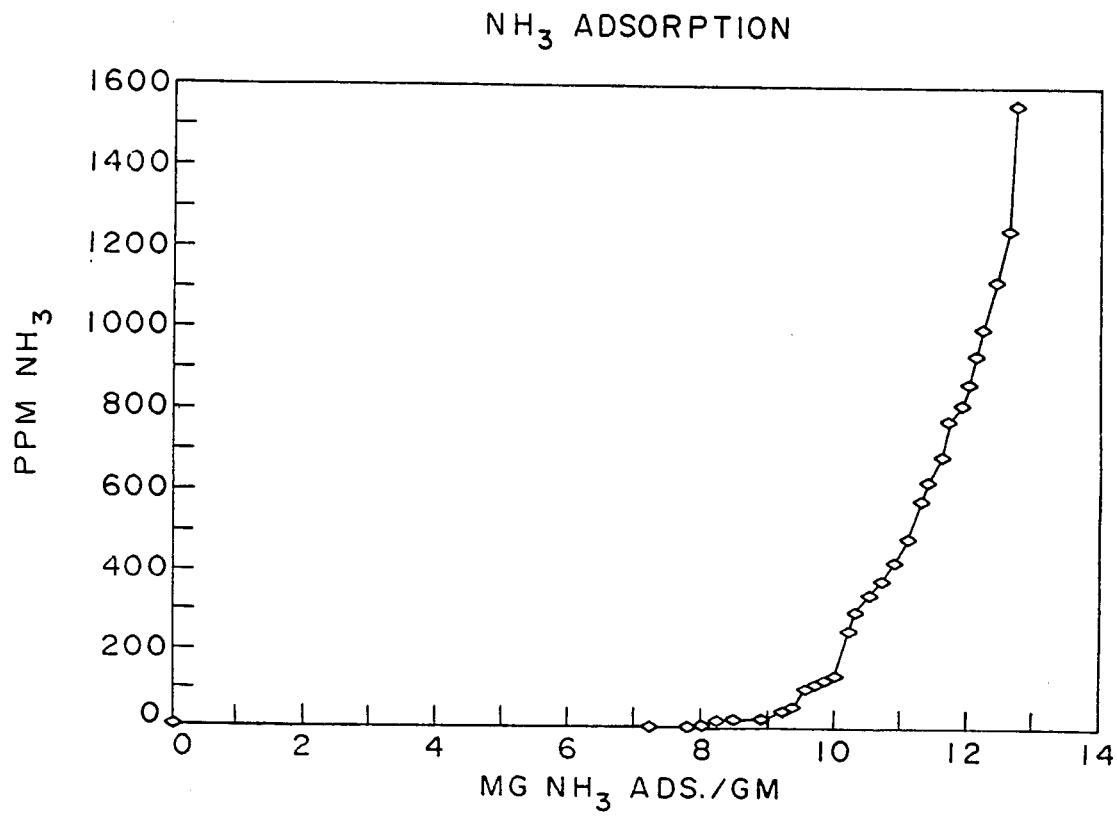
FIG. 4 is a graph plotting the adsorption capacity of ammonia by the adsorbent in mg/g against the concentration of ammonia in the effluent after regeneration in accordance with the process of the invention.
Figure 5:
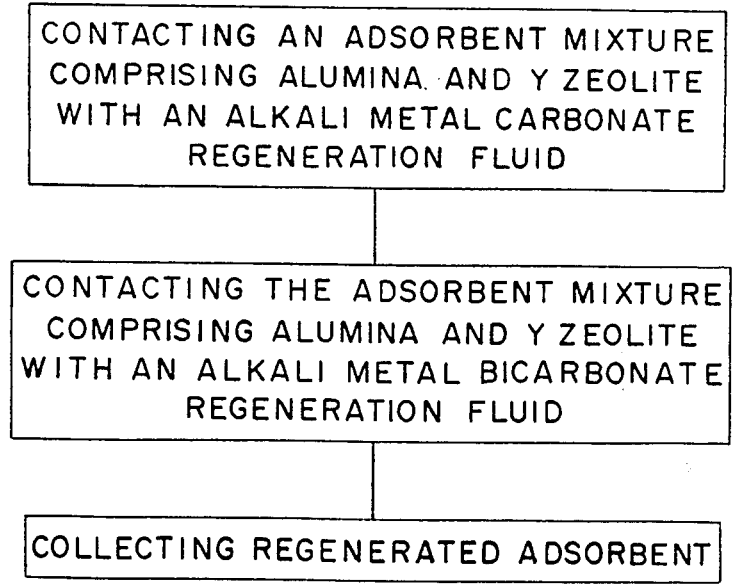
FIG. 5 is a flow sheet illustrating the process of the invention.

Referring now to FIGS. 2-4, the initial ammonia adsorption capacity of the adsorbent is shown in FIG. 2 where the abscissa represents the total amount of ammonia adsorbed (believed to be $NH_4$) in milligrams per gram of adsorbent and the ordinate shows the concentration of ammonia in ppm in the effluent. FIG. 3 shows the same type of data after a two-step nonbulk displacement regeneration of the adsorbent whereby the salt solution were not passed through plug flow but a closed loop circulation of the salts. As can be seen, the majority of the capacity was restored, e.g., 70 to 90% or higher. However, the low end sorptive capacity was lost with 20 ppm $NH_3$ in the effluent. That is, the low end breakthrough capacity is highly dependent on having low $NH_3$ concentration in the regeneration salt solutions. Thus, it can be seen that plug flow is more efficient than continuous recirculation where the $NH_3$ is not effectively stripped. For example, if in the continuous system the $NH_3$ is stripped or removed, then regeneration equivalent to plug flow is obtained.

FIG. 4 plots the adsorption capacity of the adsorbent for ammonia in the same manner as in FIGS. 2 and 3 after regeneration of the adsorbent in accordance with the 2 step process of the invention using counter current or plug flow. By comparison with FIG. 2, it will be seen that the adsorbent regenerated in accordance with the invention has a capacity for ammonia adsorption equal to or greater than the original adsorbent.

Thus the invention provides for an improved process for the regeneration of an adsorbent comprising a mixture of alumina and a Y type zeolite having ammonia adsorbed on it wherein the adsorption capacity of the adsorbent for ammonia, after regeneration by treatment in a first step with an alkali metal carbonate and in a second step with an alkali metal bicarbonate, is as good or better than the original adsorption capacity.

Having thus described the invention, what is claimed is:

1. An improved process for the regeneration of an adsorbent having ammonia adsorbed thereon and comprising a mixture of an alumina and a Y zeolite to regenerate said adsorbent to substantially its original capacity for adsorbing ammonia which comprises:
   (a) treating the adsorbent with a saturated solution of an alkali metal carbonate to remove a substantial portion of the ammonia sorbed on the adsorbent mixture; and
   (b) then treating the adsorbent in a second step with a saturated alkali metal bicarbonate solution to restore the ammonia adsorbent capacity of the adsorbent mixture to substantially its original capacity.

2. The process of claim 1 wherein said step of treating said adsorbent with a saturated alkali metal carbonate solution comprises treating said adsorbent with a saturated sodium carbonate solution.

3. The process of claim 1 wherein said step of treating said adsorbent with a saturated alkali metal bicarbonate solution comprises treating said adsorbent with a saturated sodium bicarbonate solution.

4. The process of claim 1 wherein said steps of treating said adsorbent with a saturated alkali metal carbonate solution and subsequently treating said adsorbent with a saturated alkali metal bicarbonate solution comprises passing said solutions through said adsorbent in a flow direction countercurrent to the flow of the liquid from which the ammonia was initially adsorbed onto said adsorbent.

5. The process of claim 1 wherein said step of contacting said adsorbent with a saturated solution of an alkali metal carbonate solution comprises passing an amount of said saturated alkali metal carbonate solution in the range of about at least 1 to 5 times the volume of said adsorbent countercurrently through said adsorbent.

6. The process of claim 5 wherein the flow of said saturated alkali metal carbonate solution through said adsorbent is maintained for a period of time sufficient to substantially strip the adsorbed $NH_3$ from the adsorbent.

7. The process of claim 5 wherein the flow rate of said saturated alkali metal carbonate solution passing through said adsorbent is at least 0.5 to 4 times the volume of adsorbent per hour.

8. The process of claim 1 wherein said step of contacting said adsorbent with a saturated solution of an alkali metal bicarbonate solution comprises passing an amount of said saturated alkali metal bicarbonate solution equal to from 1.5 to 4 times the volume of said adsorbent countercurrently through said adsorbent.

9. The process of claim 8 wherein said step of contacting said adsorbent with a saturated solution of an alkali metal bicarbonate solution comprises passing an amount of said saturated alkali metal bicarbonate solution equal to about 2 times the volume of said adsorbent countercurrently through said adsorbent.

10. The process of claim 8 wherein the flow rate of said saturated alkali metal bicarbonate solution passing through said adsorbent is about at least 0.25 to 4 times the volume of adsorbent per hour.

11. The process of claim 1 wherein said regeneration process is carried out at a temperature of from about 20° to 40° C.

12. The process of claim 10 wherein said regeneration process is carried out at a temperature of from about 20° to 30° C.

13. An improved process for the regeneration of a bed of adsorbent having ammonia adsorbed thereon and comprising a mixture of an alumina and a Y zeolite to regenerate said adsorbent to substantially its original capacity for adsorbing ammonia which comprises:

(a) passing from 1 to 5 bed volumes of a saturated solution of sodium carbonate through said adsorbent bed at a temperature of from about 20° to 30° C. in a direction opposite to the normal direction of flow through said adsorbent bed to remove a substantial portion of the ammonia sorbed on the adsorbent mixture: and (b) then passing from 1.5 to 4 bed volumes of a saturated sodium bicarbonate solution through said adsorbent bed at a temperature of from about 20° to 30° C. in a direction opposite to the normal direction of flow through said adsorbent bed to restore the ammonia adsorbent capacity of the adsorbent mixture to substantially its original capacity.

* * * * *